US010511170B2

(12) United States Patent
Lee

(10) Patent No.: US 10,511,170 B2
(45) Date of Patent: Dec. 17, 2019

(54) REACTIVE POWER COMPENSATOR, DISCHARGING SYSTEM, AND OPERATING METHOD OF THE DISCHARGING SYSTEM

(71) Applicant: LSIS CO., LTD., Anyang-si, Gyeonggi-do (KR)

(72) Inventor: Hwachun Lee, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/286,825

(22) Filed: Feb. 27, 2019

(65) Prior Publication Data

US 2019/0305557 A1 Oct. 3, 2019

(30) Foreign Application Priority Data

Apr. 3, 2018 (KR) .......................... 10-2018-0038483

(51) Int. Cl.
*H02J 3/18* (2006.01)
*H02J 3/16* (2006.01)
*G05F 1/70* (2006.01)

(52) U.S. Cl.
CPC .............. *H02J 3/1857* (2013.01); *H02J 3/16* (2013.01); *G05F 1/70* (2013.01)

(58) Field of Classification Search
CPC ....... G05F 1/70; H02J 3/16; H02J 3/18; H02J 3/1807; H02J 3/1814; H02J 3/14842; H02J 3/1857
USPC .......................... 323/205, 207, 208, 209, 210
See application file for complete search history.

(56) References Cited

U.S. PATENT DOCUMENTS

| 2011/0254517 A1* | 10/2011 | Morishima | G05F 1/70 323/207 |
| 2013/0271941 A1* | 10/2013 | Guan | H05K 7/18 361/811 |
| 2014/0077767 A1* | 3/2014 | Hasler | H02J 3/1857 320/128 |
| 2016/0149397 A1* | 5/2016 | Kim | H04M 1/026 307/326 |

(Continued)

FOREIGN PATENT DOCUMENTS

| WO | 2017078238 A1 | 5/2017 |
| WO | 2017102033 A1 | 6/2017 |

OTHER PUBLICATIONS

European Search Report for related European Application No. 19160157.4; action dated May 8, 2019; (6 pages).

*Primary Examiner* — Gary L Laxton
*Assistant Examiner* — Peter M Novak
(74) *Attorney, Agent, or Firm* — K&L Gates LLP

(57) ABSTRACT

A reactive power compensator includes a first converter connected between a first line and a second line, a second converter connected between the second line and a third line, and a third converter connected between the third line and the first line. The first to third lines may be connected to a bus. The first converter may include a first cluster including first to $n^{th}$ submodules which are serially connected to one another and each include a first capacitor and a first discharging connection unit connected to the first capacitor so that, when driving of the reactive power compensator stops, the first capacitors of the first to $n^{th}$ submodules are electrically connected to one another.

12 Claims, 6 Drawing Sheets

(56) References Cited

U.S. PATENT DOCUMENTS

2018/0323698 A1 11/2018 Oh et al.

* cited by examiner

US 10,511,170 B2

REACTIVE POWER COMPENSATOR, DISCHARGING SYSTEM, AND OPERATING METHOD OF THE DISCHARGING SYSTEM

CROSS-REFERENCE TO RELATED APPLICATION

Pursuant to 35 U.S.C. § 119(a), this application claims the benefit of earlier filing date and right of priority to Korean Application No. 10-2018-0038483, filed on Apr. 3, 2018, the contents of which is incorporated by reference herein in its entirety.

BACKGROUND OF THE DISCLOSURE

1. Field of the Disclosure

The present disclosure relates to a reactive power compensator and a discharging system.

2. Background of the Disclosure

Population growth and industrial advancements rapidly increase the demand for power but power generation has limits.

Therefore, a power system for stably supplying power generated by a producer to a demand area without loss is becoming an increasingly important issue.

Flexible alternating current (AC) transmission system (FACTS) equipment for enhancing a power flow, a grid voltage, and stability are needed. In the FACTS equipment, static synchronous compensator (STATCOM) equipment which is a type of power compensator called $3^{rd}$ generation is provided to a power system in parallel and compensates for reactive power needed for the power system.

FIG. 1 illustrates a general power grid system.

As illustrated in FIG. 1, a general power grid system 10 may include a power generating source 20, a power system 30, a load 40, and a plurality of reactive power compensator 50.

The power generating source 20 denotes a place or equipment which generates power and may be understood as a generator for generating power.

The power system 30 may denote equipment including a power cable, a pylon, a lighting arrester, and an insulator for transferring power generated by the power generating source 20 to the load 40.

The load 40 denotes a place or equipment which consumes the power generated by the power generating source 20.

The reactive power compensator 50 is an STATCOM and may be a device which, when reactive power of power flowing to the power system 30 is insufficient, compensates for the reactive power.

Recently, the power compensator 50 is in a trend where modular multilevel converter (MMC) type STATCOM equipment increases. The MMC type STATCOM equipment may be configured with a plurality of submodules.

Driving of the power compensator 50 is stopped for inspecting states of the plurality of submodules or replacing a broken-down submodule. Natural discharging is performed after driving is stopped, and much time is needed for completely discharging the power compensator 50 so as to be suitable for a worker who works.

There is many cases where a worker always works in an environment exposed to a high voltage, and due to this, complete discharging is necessary. However, since much time is taken in discharging, a worker works in a state where discharging is not completely made, causing severe damage of a worker.

SUMMARY OF THE DISCLOSURE

Embodiments are for solving the above-described problems and another problem.

Therefore, an aspect of the detailed description is to provide a reactive power compensator capable of being quickly discharged and a discharging system.

Another aspect of the detailed description is to provide a reactive power compensator and a discharging system, which secure stability of a worker.

According to a first aspect of an embodiment, a reactive power compensator includes: a first converter connected between a first line and a second line; a second converter connected between the second line and a third line; and a third converter connected between the third line and the first line. The first to third lines may be connected to a bus. The first converter may include: a first cluster including first to $n^{th}$ submodules which are serially connected to one another and each include a first capacitor; and a first discharging connection unit connected to the first capacitor so that, when driving of the reactive power compensator stops, the first capacitors of the first to $n^{th}$ submodules are electrically connected to one another.

According to a second aspect of an embodiment, a reactive power compensator includes: a first converter connected between a first line and a second line; a second converter connected between the second line and a ground; and a third converter connected between the third line and the ground. The first to third lines may be connected to a bus. The first converter may include: a first cluster including first to $n^{th}$ submodules which are serially connected to one another and each include a first capacitor; and a first discharging connection unit connected to the first capacitor so that, when driving of the reactive power compensator stops, the first capacitors of the first to $n^{th}$ submodules are electrically connected to one another.

According to a third aspect of an embodiment, a discharging system includes: a power compensation unit connected to a bus, the power compensation unit including first to third clusters; a first switch turned on so that the power compensation unit is connected to or disconnected from the bus; a second switch turned on so that the power compensation unit is selectively connected to the bus or a ground; a voltage sensor connected between the bus and the first to third clusters; and a current sensor connected between the bus and the power compensation unit. When driving of the power compensation unit stops, the first switch is turned off and a discharging connection member is connected to capacitors of each of first to $n^{th}$ submodules included in the first to third clusters so that the capacitors are electrically connected to one another, and then, the second switch is turned on and a residual voltage of each of the first to $n^{th}$ submodules is discharged to the ground via the discharging connection member and the second switch.

According to a fourth aspect of an embodiment, an operating method of a discharging system including a power compensation unit which is connected to a bus and includes first to third clusters, a first switch turned on so that the power compensation unit is connected to or disconnected from the bus, a second switch turned on so that the power compensation unit is selectively connected to the bus or a ground, a voltage sensor connected between the bus and the first to third clusters, and a current sensor connected between the bus and the power compensation unit, the operating method including: when the power compensation unit stops, turning off the first switch and connecting a discharging connection unit to the first to third clusters; turning on the second switch to discharge a voltage of each of the first to third clusters through the discharging connection unit and the second switch; sensing a current of the power compensation unit by using the current sensor to check a discharging state of the power compensation unit; and turning on the first switch, turning off the second switch, and sensing a voltage of the power compensation unit by using the voltage sensor to check a discharging state of the power compensation unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, embodiments disclosed in the specification will be described in detail with reference to the accompanying drawings. The suffixes "module" and "unit" to elements used herein is assigned or used in consideration of easiness of description of the specification, and do not have a meaning or a role differentiated from each other. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings, and this does not limit the present invention within specific embodiments and it should be understood that the present invention covers all the modifications, equivalents, and replacements within the idea and technical scope of the present invention.

Figure 1:
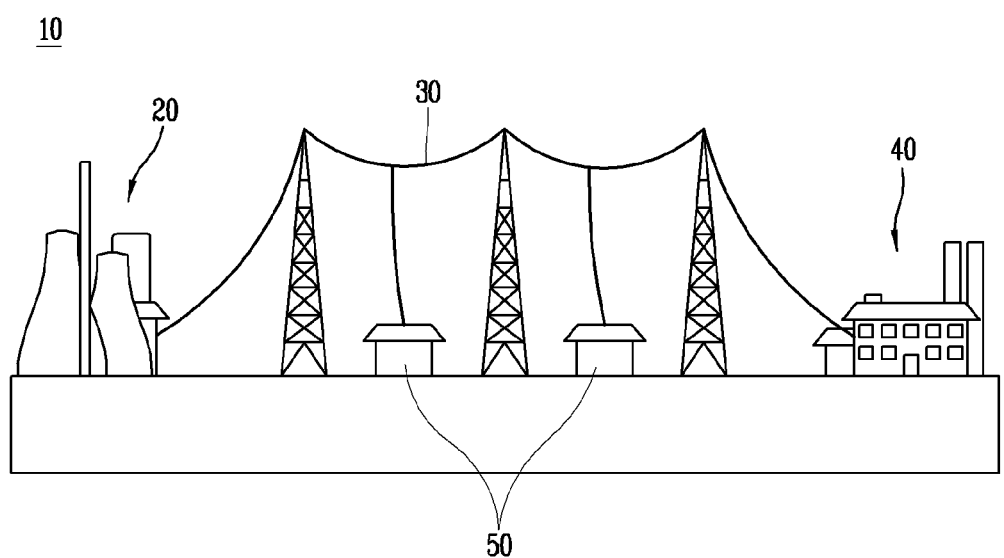
FIG. 1 illustrates a general power grid system.
Figure 2:
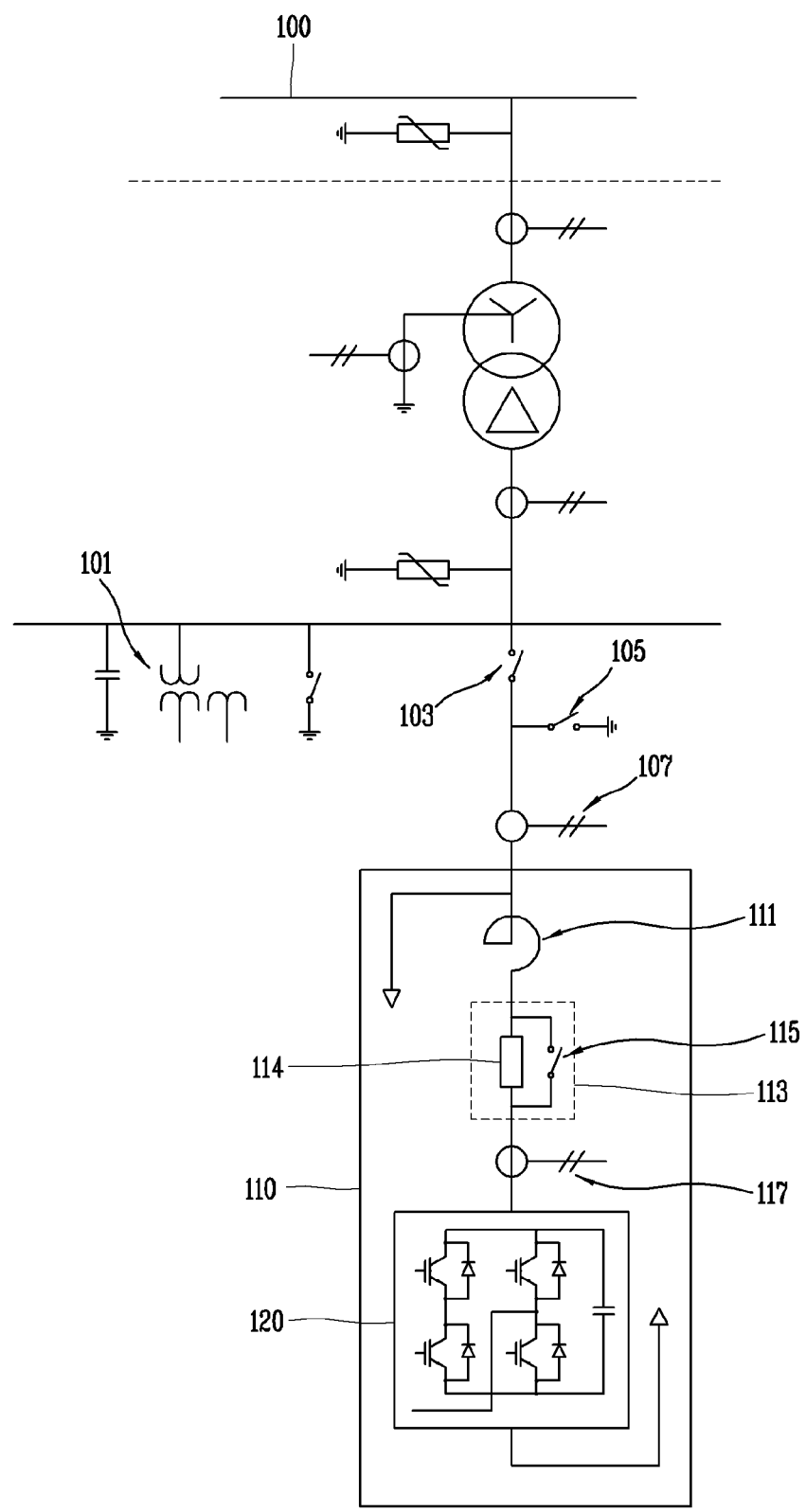
FIG. 2 is a broken wire view illustrating a discharging system according to an embodiment.

FIG. 2 is a broken wire view illustrating a discharging system according to an embodiment.

Referring to FIG. 2, a power compensation unit 110 may be connected to a bus 100 and may compensate for reactive power or effective power.

A first switch 103, a second switch 105, a voltage sensor 101, and a first current sensor 107 may be disposed between the bus 100 and the power compensation unit 110.

The first switch 103 may be turned on in order for the power compensation unit 110 to be connected to or disconnected from the bus 100. The second switch 105 may be turned on in order for the power compensation unit 110 to be selectively connected to the bus 100 and a ground. The voltage sensor 101 may sense a voltage of the power compensation unit 110. The first current sensor 107 may sense a current of the power compensation unit 110.

The power compensation unit 110 may include a reactor 111, a current adjuster 113, a second current sensor 117, and a cluster 120.

The reactor 111 may remove noise or may improve a power factor.

The current adjuster 113 may prevent a high voltage of power of the bus 100 from being rapidly applied to the power compensation unit 110 in initial driving of the power compensation unit 110. When driving of the power compensation unit 110 starts, the power compensation unit 110 may be supplied with the power of the bus 100, and a capacitor may be charged with the supplied power. Subsequently, the cluster 120 may be driven with the power charged into the capacitor.

The current adjuster 113 may include a resistor 114 and a third switch 115. The third switch 115 may be turned off in initial driving of the power compensation unit 110, and a rapid current based on the power of the bus 100 may be reduced by the resistor 114. When the third switch 115 is turned off after the rapid current is reduced, a reduced current may be bypassed to the third switch 115 and may be supplied to the cluster 120.

The second current sensor 117 may sense a current flowing in each of clusters (121, 123, and 125 of FIGS. 3 and 4 and 151, 153, and 155 of FIGS. 5 and 6) of the cluster 120.

A power compensation unit having a delta connection topology structure will be described in detail with reference to FIG. 3.

A power compensation unit 110 may include a first converter, a second converter, and a third converter each configuring a three-phase converter. For example, the first converter may convert a first phase power in the three-phase power. The second converter may convert a second phase power in the three-phase power. The third converter may convert a third phase power in the three-phase power.

In this case, the first converter may be connected to the second converter, the second converter may be connected to the third converter, and the third converter may be connected to the first converter. In detail, the first converter may be connected between a first line R and a second line S, the second converter may be connected between the second line S and a third line T, and the third converter may be connected between the third line T and the first line R. The first to third lines R, S, and T may be connected to a bus 100.

The first converter may include a first current adjuster 113a, a first cluster 121, and a first reactor 111a. The first current adjuster 113a may include a first resistor 114a and a fourth switch 115a. The first current adjuster 113a may be connected between the first line R and a first node n1a, the first cluster 121 may be connected between the first node n1a and a second node n1b, and the first reactor 111a may be connected between the second node n1b and the second line S. The first reactor 111a may be directly and serially connected to the first current adjuster 113a.

The first cluster 121 may include first to $n^{th}$ submodules 121-1 to 121-n which are serially connected to one another. One side of the first submodule 121-1 may be connected to the first node n1a, and the other side of the first submodule 121-1 may be connected to the second submodule 121-2. The second submodule 121-2 may be connected to the third submodule 121-3. In this manner, each submodule may be connected between adjacent submodules. One side of a last submodule (i.e., the $n^{th}$ submodule 121-n) may be connected to a previous submodule (i.e., the $(n-1)^{th}$ submodule 121-(n-1)), and the other side of the $n^{th}$ submodule 121-n may be connected to the second node n1b.

The second converter may include a second current adjuster 113b, a second cluster 123, and a second reactor 111b. The second current adjuster 113b may include a second resistor 114b and a fifth switch 115b. The second current adjuster 113b may be connected between the second line S and a first node n2a, the second cluster 123 may be connected between the first node n2a and a second node n2b, and the second reactor 111b may be connected between the second node n2b and the third line T. The second reactor 111b may be directly and serially connected to the second current adjuster 113b.

The second cluster 123 may include first to $n^{th}$ submodules 123-1 to 123-n which are serially connected to one another. One side of the first submodule 123-1 may be connected to the first node n2a, and the other side of the first submodule 123-1 may be connected to the second submodule 123-2. The second submodule 123-2 may be connected to the third submodule 123-3. In this manner, each submodule may be connected between adjacent submodules. One side of a last submodule (i.e., the $n^{th}$ submodule 123-n) may be connected to a previous submodule (i.e., the $(n-1)^{th}$ submodule 123-(n-1)), and the other side of the $n^{th}$ submodule 123-n may be connected to the second node n2b.

The third converter may include a third current adjuster 113c, a third cluster 125, and a third reactor 111c. The third current adjuster 113c may include a third resistor 114c and a sixth switch 115c. The third current adjuster 113c may be connected between the third line T and a first node n3a, the third cluster 125 may be connected between the first node n3a and a second node n3b, and the third reactor 111c may be connected between the second node n3b and the first line R. The third reactor 111c may be directly and serially connected to the third current adjuster 113c.

The third cluster 125 may include first to $n^{th}$ submodules 125-1 to 125-n which are serially connected to one another. One side of the first submodule 125-1 may be connected to the first node n3a, and the other side of the first submodule 125-1 may be connected to the second submodule 125-2. The second submodule 125-2 may be connected to the third submodule 125-3. In this manner, each submodule may be connected between adjacent submodules. One side of a last submodule (i.e., the $n^{th}$ submodule 125-n) may be connected to a previous submodule (i.e., the $(n-1)^{th}$ submodule 125-(n-1)), and the other side of the $n^{th}$ submodule 125-n may be connected to the second node n3b.

The first current adjuster 113a of the first converter, the second current adjuster 113b of the second converter, and the third current adjuster 113c of the third converter may be included in the current adjuster 113 illustrated in FIG. 2. The first reactor 111a of the first converter, the second reactor 111b of the second converter, and the third reactor 111c of the third converter may be included in the reactor 111 illustrated in FIG. 2. The first cluster 121 of the first converter, the second cluster 123 of the second converter, and the third cluster 125 of the third converter may be included in the cluster 120 illustrated in FIG. 2.

The submodules 121-1 to 121-n (123-1 to 123-n and 125-1 to 125-n) may each include first to fourth switching modules and may respectively include a plurality of capacitors 122-1 to 122-n (124-1 to 124-n and 126-1 to 126-n).

When driving of the power compensation unit 110 starts, the power of the bus 100 may be charged into the capacitors 122-1 to 122-n (124-1 to 124-n and 126-1 to 126-n), and power charged into the capacitors 122-1 to 122-n (124-1 to 124-n and 126-1 to 126-n) may be used as power for driving various electronic devices. Examples of the electronic devices may include a self-power supply (SPS), a gate driver, and a submodule interface (SMI).

Subsequently, the first to fourth switching modules of each of the submodules 121-1 to 121-n (123-1 to 123-n and 125-1 to 125-n) may be turned on, and thus, power conversion may be performed. Accordingly, reactive power or effective power may be compensated for, based on the power conversion.

A power compensation unit having a star connection topology structure will be described in detail with reference to FIG. 5.

A power compensation unit 110 may include a first converter, a second converter, and a third converter. The first converter may be connected between a first line R and a ground, the second converter may be connected between a second line S and the ground, and the third converter may be connected between a third line T and the ground. The first to third lines R, S, and T may be connected to a bus 100.

The first converter may convert a first phase power in a three-phase power. The second converter may convert a second phase power in the three-phase power. The third converter may convert a third phase power in the three-phase power.

The first converter may include a first current adjuster 143a, a first cluster 151, and a first reactor 141a. The first current adjuster 143a may include a first resistor 144a and a seventh switch 145a. The first reactor 141a may be directly and serially connected to the first current adjuster 113a. The first reactor 141a may be connected between the first line R and a first node n1a, the first cluster 151 may be connected between the first node n1a and a second node n1b, and the first current adjuster 143a may be connected between the second node n1b and the ground. The first reactor 141a may be directly and serially connected to the first current adjuster 143a.

The first cluster 151 may include first to $n^{th}$ submodules 151-1 to 151-n which are serially connected to one another. One side of the first submodule 151-1 may be connected to the first node n1a, and the other side of the first submodule 151-1 may be connected to the second submodule 151-2. The second submodule 151-2 may be connected to the third submodule 151-3. In this manner, each submodule may be connected between adjacent submodules. One side of a last submodule (i.e., the $n^{th}$ submodule 151-n) may be connected to a previous submodule (i.e., the $(n-1)^{th}$ submodule 151-(n-1)), and the other side of the $n^{th}$ submodule 151-n may be connected to the second node n1b.

The second converter may include a second current adjuster 143b, a second cluster 153, and a second reactor 141b. The second current adjuster 143b may include a second resistor 144b and an eighth switch 145b. The second reactor 141b may be connected between the second line S and a first node n2a, the second cluster 153 may be connected between the first node n2a and a second node n2b, and the second current adjuster 143b may be connected between the second node n2b and the ground. The second reactor 141b may be directly and serially connected to the second current adjuster 143b.

The second cluster 153 may include first to $n^{th}$ submodules 153-1 to 153-n which are serially connected to one another. One side of the first submodule 153-1 may be connected to the first node n2a, and the other side of the first submodule 153-1 may be connected to the second submodule 153-2. The second submodule 153-2 may be connected to the third submodule 153-3. In this manner, each submodule may be connected between adjacent submodules. One side of a last submodule (i.e., the $n^{th}$ submodule 153-n) may be connected to a previous submodule (i.e., the $(n-1)^{th}$ submodule 153-(n-1)), and the other side of the $n^{th}$ submodule 153-n may be connected to the second node n2b.

The third converter may include a third current adjuster 143c, a third cluster 155, and a third reactor 141c. The third current adjuster 143c may include a third resistor 144c and a ninth switch 145c. The third reactor 141c may be connected between the third line T and a first node n3a, the third cluster 155 may be connected between the first node n3a and a second node n3b, and the third current adjuster 143c may be connected between the second node n3b and the ground. The third reactor 141c may be directly and serially connected to the third current adjuster 143c.

The third cluster 155 may include first to $n^{th}$ submodules 155-1 to 155-n which are serially connected to one another. One side of the first submodule 155-1 may be connected to the first node n3a, and the other side of the first submodule 155-1 may be connected to the second submodule 155-2. The second submodule 155-2 may be connected to the third submodule 155-3. In this manner, each submodule may be connected between adjacent submodules. One side of a last submodule (i.e., the $n^{th}$ submodule 155-n) may be connected to a previous submodule (i.e., the $(n-1)^{th}$ submodule 155-(n-1)), and the other side of the $n^{th}$ submodule 155-n may be connected to the second node n3b.

The first current adjuster 143a of the first converter, the second current adjuster 143b of the second converter, and the third current adjuster 143c of the third converter may be included in the current adjuster 113 illustrated in FIG. 2. The first reactor 141a of the first converter, the second reactor 141b of the second converter, and the third reactor 141c of the third converter may be included in the reactor 111 illustrated in FIG. 2. The first cluster 151 of the first converter, the second cluster 153 of the second converter, and the third cluster 155 of the third converter may be included in the cluster 120 illustrated in FIG. 2.

The submodules 151-1 to 151-n (153-1 to 153-n and 155-1 to 155-n) may each include first to fourth switching modules and may respectively include a plurality of capacitors 152-1 to 152-n (154-1 to 154-n and 156-1 to 156-n).

When driving of the power compensation unit 110 starts, the power of the bus 100 may be charged into the capacitors 152-1 to 152-n (154-1 to 154-n and 156-1 to 156-n), and power charged into the capacitors 152-1 to 152-n (154-1 to 154-n and 156-1 to 156-n) may be used as power for driving various electronic devices. Examples of the electronic devices may include a self-power supply (SPS), a gate driver, and an interface.

Subsequently, the first to fourth switching modules of each of the submodules 151-1 to 151-n (153-1 to 153-n and 155-1 to 155-n) may be turned on, and thus, power conversion may be performed. Accordingly, reactive power or effective power may be compensated for, based on the power conversion.

Hereinafter, a discharging operation in a discharging system (see FIG. 2) according to an embodiment will be described in detail.

Figure 3:
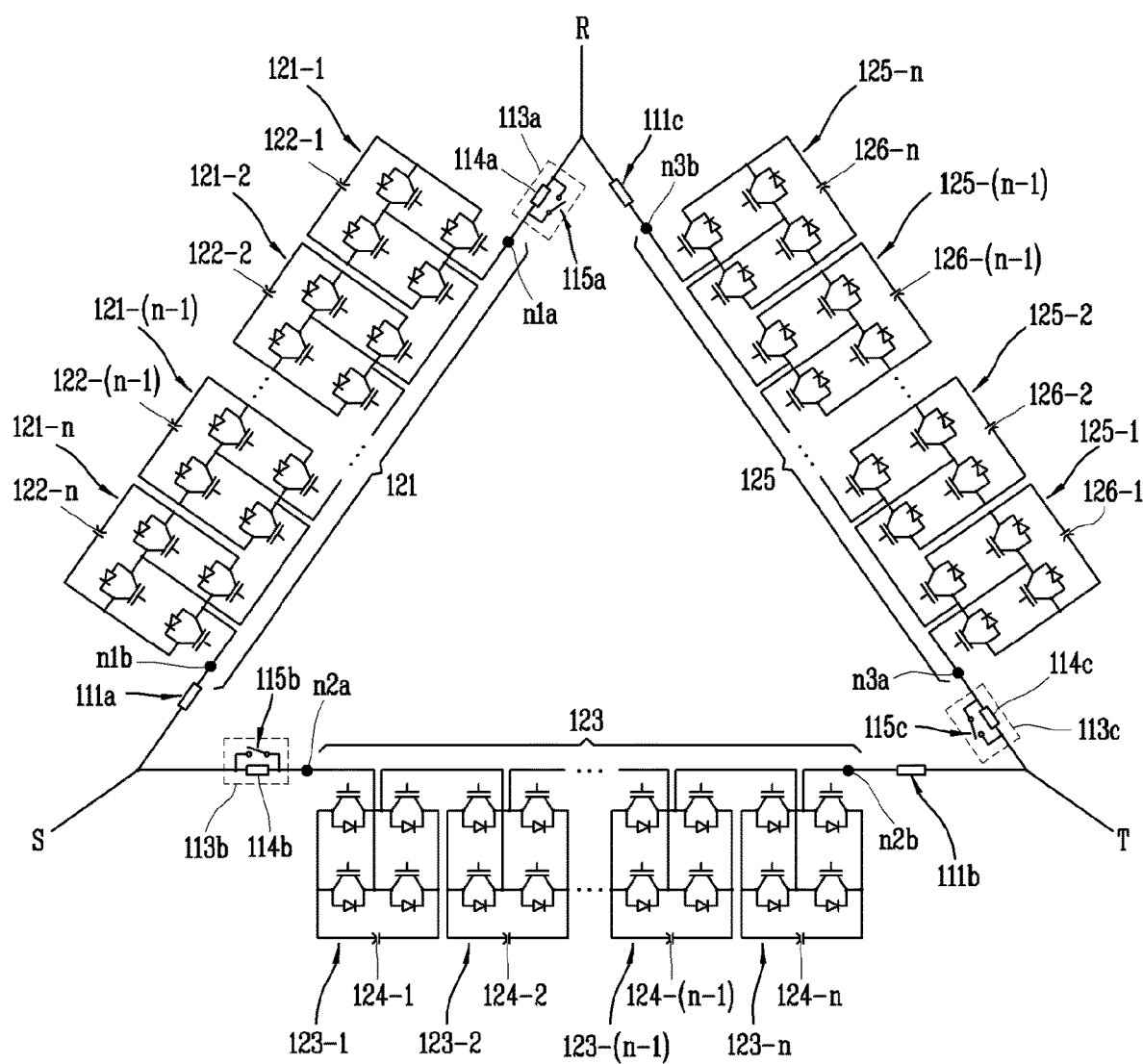
FIGS. 3 and 4 are diagrams for describing a discharging operation in a discharging system including a power compensation unit having a delta connection topology structure according to a first embodiment.
Figure 4:
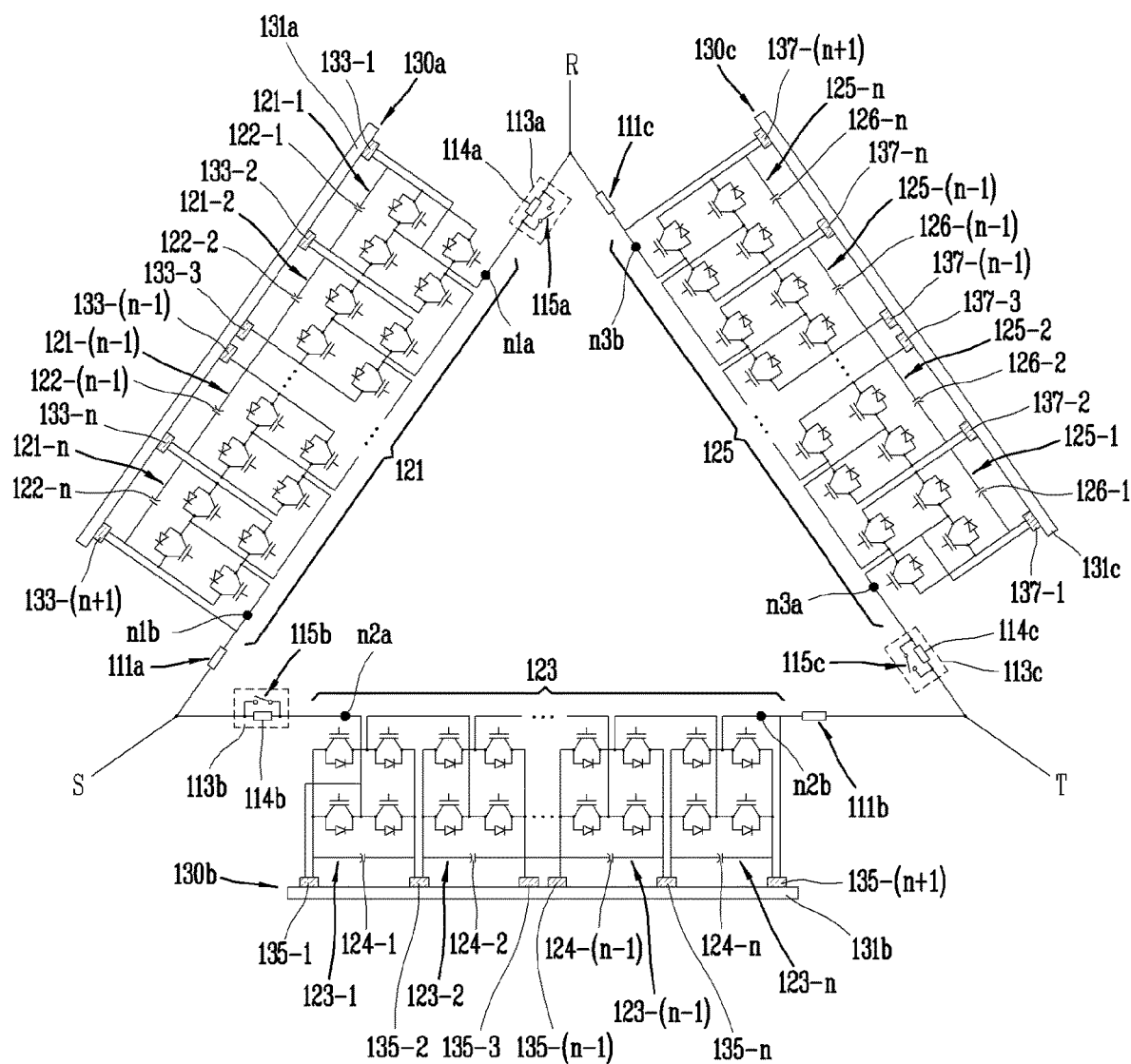

FIGS. 3 and 4 are diagrams for describing a discharging operation in a discharging system including a power compensation unit having a delta connection topology structure according to a first embodiment.

FIG. 3 illustrates a power compensation unit having the delta connection topology structure when driving is being performed, and FIG. 4 illustrates a power compensation unit having the delta connection topology structure when driving is stopped.

As illustrated in FIGS. 2 and 3, when the power compensation unit 110 is being driven, the second switch 105 may be turned off, and the first switch 103 may be turned on. Also, the fourth to sixth switches 115a to 115c respectively included in the first to third current adjusters 113a to 113c of the power compensation unit 110 may be turned off.

In this case, a three-phase voltage of the power in the bus 100 may be supplied to the power compensation unit 110. That is, a first phase voltage of the three-phase voltage may be supplied to the first converter, a second phase voltage of the three-phase voltage may be supplied to the second converter, and a third phase voltage of the three-phase voltage may be supplied to the third converter.

In a case where the power of the bus 100 is initially supplied to the power compensation unit 110, each of the first to third phase voltages may include a transient voltage which is higher than a reference value. An inrush current may occur due to the transient voltage, and the first to fourth switching modules may be damaged by the inrush current.

A transient voltage included in the first phase voltage supplied to the first converter may be reduced by the first resistor 114a of the first current adjuster 113a, and the occurrence of an inrush current may be prevented. The first phase voltage reduced by the first resistor 114a may be charged into the capacitors 122-1 to 122-n respectively included in the submodules 121-1 to 121-n of the first cluster 121.

A transient voltage included in the second phase voltage supplied to the second converter may be reduced by the second resistor 114b of the second current adjuster 113b, and the occurrence of an inrush current may be prevented. The second phase voltage reduced by the second resistor 114b may be charged into the capacitors 124-1 to 124-n respectively included in the submodules 123-1 to 123-n of the second cluster 123.

A transient voltage included in the third phase voltage supplied to the third converter may be reduced by the third resistor 114c of the third current adjuster 113c, and the occurrence of an inrush current may be prevented. The third phase voltage reduced by the third resistor 114c may be charged into the capacitors 126-1 to 126-n respectively included in the submodules 125-1 to 125-n of the third cluster 125.

The three-phase voltage, including the first phase voltage charged into the capacitors 122-1 to 122-n respectively included in the submodules 121-1 to 121-n of the first cluster 121, the second phase voltage charged into the capacitors 124-1 to 124-n respectively included in the submodules 123-1 to 123-n of the second cluster 123, and the third phase voltage charged into the capacitors 126-1 to 126-n respectively included in the submodules 125-1 to 125-n of the third cluster 125, may be used as power for an electric device included in each of the submodules 121-1 to 121-n, 123-1 to 123-n, and 125-1 to 125-n.

When the transient voltage is reduced, the fourth to sixth switches 115a to 115c respectively included in the first to third current adjusters 113a to 113c may be turned on, and thus, the first to third phase voltages respectively supplied to the first to third clusters 121, 123, and 125 may be bypassed to the fourth to sixth switches 115a to 115c and may be supplied to the first to third clusters 121, 123, and 125.

Subsequently, the submodules 121-1 to 121-n, 123-1 to 123-n, and 125-1 to 125-n respectively included in the first to third converters may be selectively turned on, and thus, reactive power or effective power in the bus 100 may be compensated for. That is, the effective power may be supplied to the bus 100, or the reactive power from the bus 100 may be absorbed.

As illustrated in FIGS. 2 and 4, when the power compensation unit 110 stops, the first switch 103 may be turned off, and then, first to third discharging connection units 130a to 130c may be respectively connected to the first cluster 121 of the first converter, the second cluster 123 of the second converter, and the third cluster 125 of the third converter.

The first to third discharging connection units 130a to 130c may be connected to or disconnected from the first cluster 121 of the first converter, the second cluster 123 of the second converter, and the third cluster 125 of the third converter, respectively. For example, when the power compensation unit 110 is driven, the first to third discharging connection units 130a to 130c may not be connected to the first cluster 121 of the first converter, the second cluster 123 of the second converter, and the third cluster 125 of the third converter. For example, when the power compensation unit 110 stops and thus a residual voltage is discharged, the first to third discharging connection units 130a to 130c may be connected to the first cluster 121 of the first converter, the second cluster 123 of the second converter, and the third cluster 125 of the third converter, and then, when the power compensation unit 110 is in a complete discharging state, the first to third discharging connection units 130a to 130c may be disconnected therefrom.

In detail, the first discharging connection unit 130a may be connected to the capacitors 122-1 to 122-n respectively included in the first to $n^{th}$ submodules 121-1 to 121-n so that the capacitors 122-1 to 122-n respectively included in the first to $n^{th}$ submodules 121-1 to 121-n of the first cluster 121 of the first converter are electrically connected.

The first discharging connection unit 130a may include a supporter 131a and a plurality of connection electrodes 133-1 to 133-n.

The plurality of connection electrodes 133-1 to 133-n may be fastened to one surface of the supporter 131a. A length of the supporter 131a may be greater than a width of the first cluster 151 including the first to $n^{th}$ submodules 121-1 to 121-n. The capacitors 122-1 to 122-n respectively included in the submodules 121-1 to 121-n may be electrically connected to the plurality of connection electrodes 133-1 to 133-n disposed in one supporter 131a.

Although not shown, a guide hole which the first discharging connection unit 130a is loaded into or unloaded from may be provided adjacent to the capacitors 122-1 to 122-n respectively included in the submodules 121-1 to 121-n of the first cluster 151. The first discharging connection unit 130a may slide and may be inserted into the guide hole, and thus, the capacitors 122-1 to 122-n respectively included in the submodules 121-1 to 121-n of the first cluster 151 may be connected to the plurality of connection electrodes 133-1 to 133-n. Furthermore, the first discharging connection unit 130a may be unloaded from the guide hole, and thus, a connection of each of the connection electrodes 133-1 to 133-n may be released.

A width of each of the connection electrodes 133-1 to 133-n may be greater than an interval between the capacitors 122-1 to 122-n of the first to $n^{th}$ submodules 121-1 to 121-n. One side of one submodule may be electrically connected to each of the connection electrodes 133-1 to 133-n, and one side of another submodule adjacent to the one submodule may be electrically connected to each of the connection electrodes 133-1 to 133-n. Therefore, the capacitors 122-1 to 122-n of an adjacent submodule may be electrically connected to one another by the connection electrodes 133-1 to 133-n.

A first connection electrode (i.e., a first connection electrode 133-1) of the connection electrodes 133-1 to 133-n disposed in the supporter 131a may be connected to a first node n1a, and a last connection electrode (i.e., an $(n+1)^{th}$ connection electrode 133-(n+1)) may be connected to a second node n1b. Therefore, an electrical path which connects from the first node n1a to the second node n1b via the capacitors 122-1 to 122-n of the first to $n^{th}$ submodules 121-1 to 121-n may be formed. Voltages of the capacitors 122-1 to 122-n of the submodules 121-1 to 121-n may be discharged through the electrical path. Accordingly, the voltages of the capacitors 122-1 to 122-n of the first to $n^{th}$ submodules 121-1 to 121-n may be discharged by the first discharging connection unit 130a.

The second discharging connection unit 130b may be connected to the capacitors 124-1 to 124-n respectively included in the first to $n^{th}$ submodules 123-1 to 123-n so that the capacitors 124-1 to 124-n respectively included in the first to $n^{th}$ submodules 123-1 to 123-n of the second cluster 123 of the second converter are electrically connected.

The second discharging connection unit 130b may include a supporter 131b and a plurality of connection electrodes 135-1 to 135-n.

The plurality of connection electrodes 135-1 to 135-n may be fastened to one surface of the supporter 131b. A length of the supporter 131b may be greater than a width of the second cluster 123 including the first to $n^{th}$ submodules 123-1 to 123-n. The capacitors 124-1 to 124-n respectively included in the submodules 123-1 to 123-n may be electrically connected to the plurality of connection electrodes 135-1 to 135-n disposed in one supporter 131b.

Although not shown, a guide hole which the second discharging connection unit 130b is loaded into or unloaded from may be provided adjacent to the capacitors 124-1 to 124-n respectively included in the first to $n^{th}$ submodules 123-1 to 123-n of the second cluster 123. The second discharging connection unit 130b may slide and may be inserted into the guide hole, and thus, the capacitors 124-1 to 124-n respectively included in the first to $n^{th}$ submodules 123-1 to 123-n of the second cluster 123 may be connected to the plurality of connection electrodes 135-1 to 135-n. Furthermore, the second discharging connection unit 130b may be unloaded from the guide hole, and thus, a connection of each of the connection electrodes 135-1 to 135-n may be released.

A width of each of the connection electrodes 135-1 to 135-n may be greater than an interval between the capacitors 124-1 to 124-n of the first to $n^{th}$ submodules 123-1 to 123-n. One side of one submodule may be electrically connected to each of the connection electrodes 135-1 to 135-n, and one side of another submodule adjacent to the one submodule may be electrically connected to each of the connection electrodes 135-1 to 135-$n$. Therefore, the capacitors 124-1 to 124-$n$ of an adjacent submodule may be electrically connected to one another by the connection electrodes 135-1 to 135-$n$.

A first connection electrode (i.e., a first connection electrode 135-1) of the connection electrodes 135-1 to 135-$n$ disposed in the supporter 131$b$ may be connected to a first node n2$a$, and a last connection electrode (i.e., an $(n+1)^{th}$ connection electrode 135-$(n+1)$) may be connected to a second node n2$b$. Therefore, an electrical path which connects from the first node n2$a$ to the second node n2$b$ via the capacitors 124-1 to 124-$n$ of the first to $n^{th}$ submodules 123-1 to 123-$n$ may be formed. Voltages of the capacitors 124-1 to 124-$n$ of the submodules 123-1 to 123-$n$ may be discharged through the electrical path. Accordingly, the voltages of the capacitors 124-1 to 124-$n$ of the first to $n^{th}$ submodules 123-1 to 123-$n$ may be discharged by the second discharging connection unit 130$b$.

The third discharging connection unit 130$c$ may be connected to the capacitors 126-1 to 126-$n$ respectively included in the first to $n^{th}$ submodules 125-1 to 125-$n$ so that the capacitors 126-1 to 126-$n$ respectively included in the first to $n^{th}$ submodules 125-1 to 125-$n$ of the third cluster 125 of the second converter are electrically connected.

The third discharging connection unit 130$c$ may include a supporter 131$c$ and a plurality of connection electrodes 137-1 to 137-$n$.

The plurality of connection electrodes 137-1 to 137-$n$ may be fastened to one surface of the supporter 131$c$. A length of the supporter 131$c$ may be greater than a width of the second cluster 125 including the first to $n^{th}$ submodules 125-1 to 125-$n$. The capacitors 126-1 to 126-$n$ respectively included in the submodules 125-1 to 125-$n$ may be electrically connected to the plurality of connection electrodes 137-1 to 137-$n$ disposed in one supporter 131$c$.

Although not shown, a guide hole which the second discharging connection unit 130$c$ is loaded into or unloaded from may be provided adjacent to the capacitors 126-1 to 126-$n$ respectively included in the first to $n^{th}$ submodules 125-1 to 125-$n$ of the second cluster 125. The second discharging connection unit 130$c$ may slide and may be inserted into the guide hole, and thus, the capacitors 126-1 to 126-$n$ respectively included in the first to $n^{th}$ submodules 125-1 to 125-$n$ of the second cluster 125 may be connected to the plurality of connection electrodes 137-1 to 137-$n$. Furthermore, the second discharging connection unit 130$c$ may be unloaded from the guide hole, and thus, a connection of each of the connection electrodes 137-1 to 137-$n$ may be released.

A width of each of the connection electrodes 137-1 to 137-$n$ may be greater than an interval between the capacitors 126-1 to 126-$n$ of the first to $n^{th}$ submodules 125-1 to 125-$n$. One side of one submodule may be electrically connected to each of the connection electrodes 137-1 to 137-$n$, and one side of another submodule adjacent to the one submodule may be electrically connected to each of the connection electrodes 137-1 to 137-$n$. Therefore, the capacitors 126-1 to 126-$n$ of an adjacent submodule may be electrically connected to one another by the connection electrodes 137-1 to 137-$n$.

A first connection electrode (i.e., a first connection electrode 137-1) of the connection electrodes 137-1 to 137-$n$ disposed in the supporter 131$c$ may be connected to a first node n3$a$, and a last connection electrode (i.e., an $(n+1)^{th}$ connection electrode 137-$(n+1)$) may be connected to a second node n3$b$. Therefore, an electrical path which connects from the first node n3$a$ to the second node n3$b$ via the capacitors 126-1 to 126-$n$ of the first to $n^{th}$ submodules 125-1 to 125-$n$ may be formed. Voltages of the capacitors 126-1 to 126-$n$ of the submodules 125-1 to 125-$n$ may be discharged through the electrical path. Accordingly, the voltages of the capacitors 126-1 to 126-$n$ of the first to $n^{th}$ submodules 125-1 to 125-$n$ may be discharged by the third discharging connection unit 130$c$.

The supporters 131$a$ to 131$c$ respectively included in the first to third discharging connection units 130$a$ to 130$c$ may be strong in strength for a supporting function and may have good insulation performance for electrically insulating the connection electrodes 133-1 to 133-$(n+1)$, 135-1 to 135-$(n+1)$, and 137-1 to 137-$(n+1)$, respectively. For example, each of the supporters 131$a$ to 131$c$ may include a resin material such as epoxy, but is not limited thereto. Each of the supporters 131$a$ to 131$c$ may long extend in one direction, and a cross-sectional area thereof may have, for example, a tetragonal shape. However, the present embodiment is not limited thereto.

The connection electrodes 133-1 to 133-$(n+1)$, 135-1 to 135-$(n+1)$, and 137-1 to 137-$(n+1)$ respectively included in the first to third discharging connection units 130$a$ to 130$c$ may be good in electrical conductivity. For example, the connection electrodes 133-1 to 133-$(n+1)$, 135-1 to 135-$(n+1)$, and 137-1 to 137-$(n+1)$ may each include a metal material such as copper (Cu). As seen from above, the connection electrodes 133-1 to 133-$(n+1)$, 135-1 to 135-$(n+1)$, and 137-1 to 137-$(n+1)$ may each be provided in a rectangular shape, but are not limited thereto.

Subsequently, when the first to third discharging connection units 130$a$ to 130$c$ are respectively fastened to the first cluster 121 of the first converter, the second cluster 123 of the second converter, and the third cluster 125 of the third converter, the second switch 105 may be turned on, and thus, a residual voltage of each of the first to third clusters 121, 123, and 125 may be discharged through the second switch 105. At this time, the fourth to sixth switches 115$a$ to 115$c$ respectively included in the first to third discharging connection units 130$a$ to 130$c$ of the power compensation unit 110 may be turned on or off. When the fourth to sixth switches 115$a$ to 115$c$ are turned off, the residual voltage of each of the first to third clusters 121, 123, and 125 may be more quickly discharged by the first to third resistors 114$a$ to 114$c$ respectively included in the first to third current adjusters 113$a$ to 113$c$.

Therefore, a voltage remaining in each of the capacitors 122-1 to 122-$n$ of the first cluster 121 may be discharged through the second switch 105 via the first discharging connection unit 130$a$. A voltage remaining in each of the capacitors 124-1 to 124-$n$ of the first cluster 123 may be discharged through the second switch 105 via the second discharging connection unit 130$b$. A voltage remaining in each of the capacitors 126-1 to 126-$n$ of the first cluster 125 may be discharged through the third switch 115 via the third discharging connection unit 130$c$.

According to the first embodiment (see FIGS. 3 and 4), when the power compensation unit 110 stops, the first to third discharging connection units 130$a$ to 130$c$ may be fastened to the capacitors 122-1 to 122-$n$, 124-1 to 124-$n$, and 126-1 to 126-$n$ respectively included in the first to $n^{th}$ submodules 121-1 to 121-$n$, 123-1 to 123-$n$, and 125-1 to 125-$n$ of the first to third clusters 121, 123, and 125, and thus, voltages remaining in the capacitors 122-1 to 122-$n$, 124-1 to 124-$n$, and 126-1 to 126-$n$ respectively included in the first to $n^{th}$ submodules 121-1 to 121-$n$, 123-1 to 123-$n$, and 125-1 to 125-$n$ of the first to third clusters 121, 123, and 125 may be quickly discharged through the first to third discharging connection units 130a to 130c, respectively.

Subsequently, the first current sensor 107 and/or the second current sensor 117 may sense a current of the power compensation unit 110, and thus, a discharging state of the power compensation unit 110 may be determined.

Subsequently, the first switch 103 may be turned on and the second switch 105 may be turned off, and thus, a voltage of the power compensation unit 110 may be sensed, whereby the discharging state of the power compensation unit 110 may be determined.

Subsequently, each of the first and second switches 103 and 105 may be repeatedly turned on or off, and thus, a voltage sensed by the voltage sensor 101 or a current sensed by the first current sensor 107 and/or the second current sensor 117 may be repeatedly checked, whereby whether the power compensation unit 110 is in a complete discharging state may be determined. For example, when a voltage of the power compensation unit 110 is equal to or lower than 5% of a rated voltage, it may be determined that the power compensation unit 110 is in the complete discharging state. The rated voltage may be a maximum voltage capable of being charged into the capacitors 122-1 to 122-$n$, 124-1 to 124-$n$, and 126-1 to 126-$n$, but is not limited thereto.

As described above, since each of the first and second switches 103 and 105 is repeatedly turned on or off, a worker (or a system operator) may easily check a complete discharging state of the power compensation unit 110, and an operation (an operation of replacing a defective submodule) needed for the complete discharging state may be performed, thereby securing stability of the worker.

Figure 5:
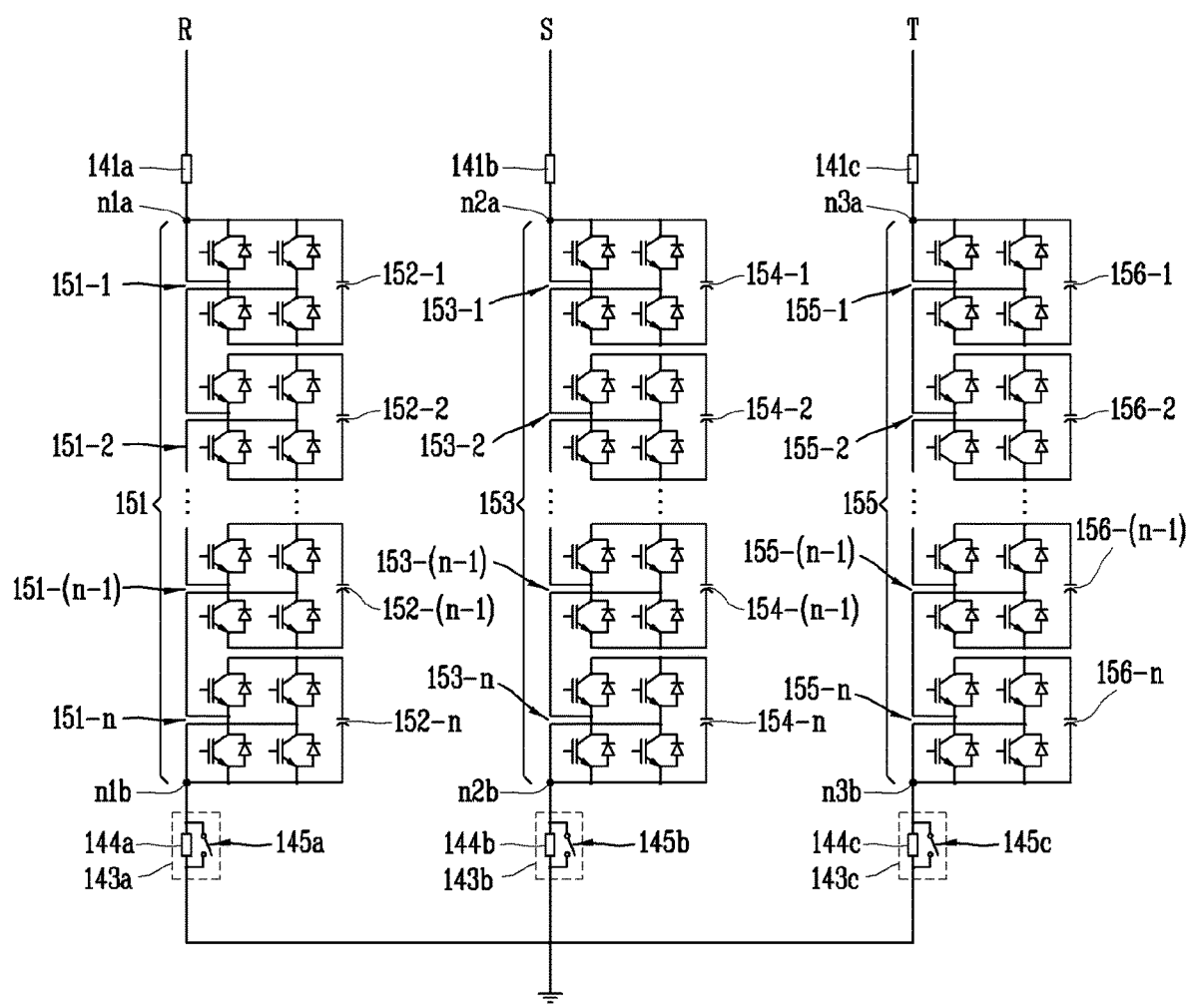
FIGS. 5 and 6 are diagrams for describing a discharging operation in a discharging system including a power compensation unit having a star connection topology structure according to a second embodiment.
Figure 6:
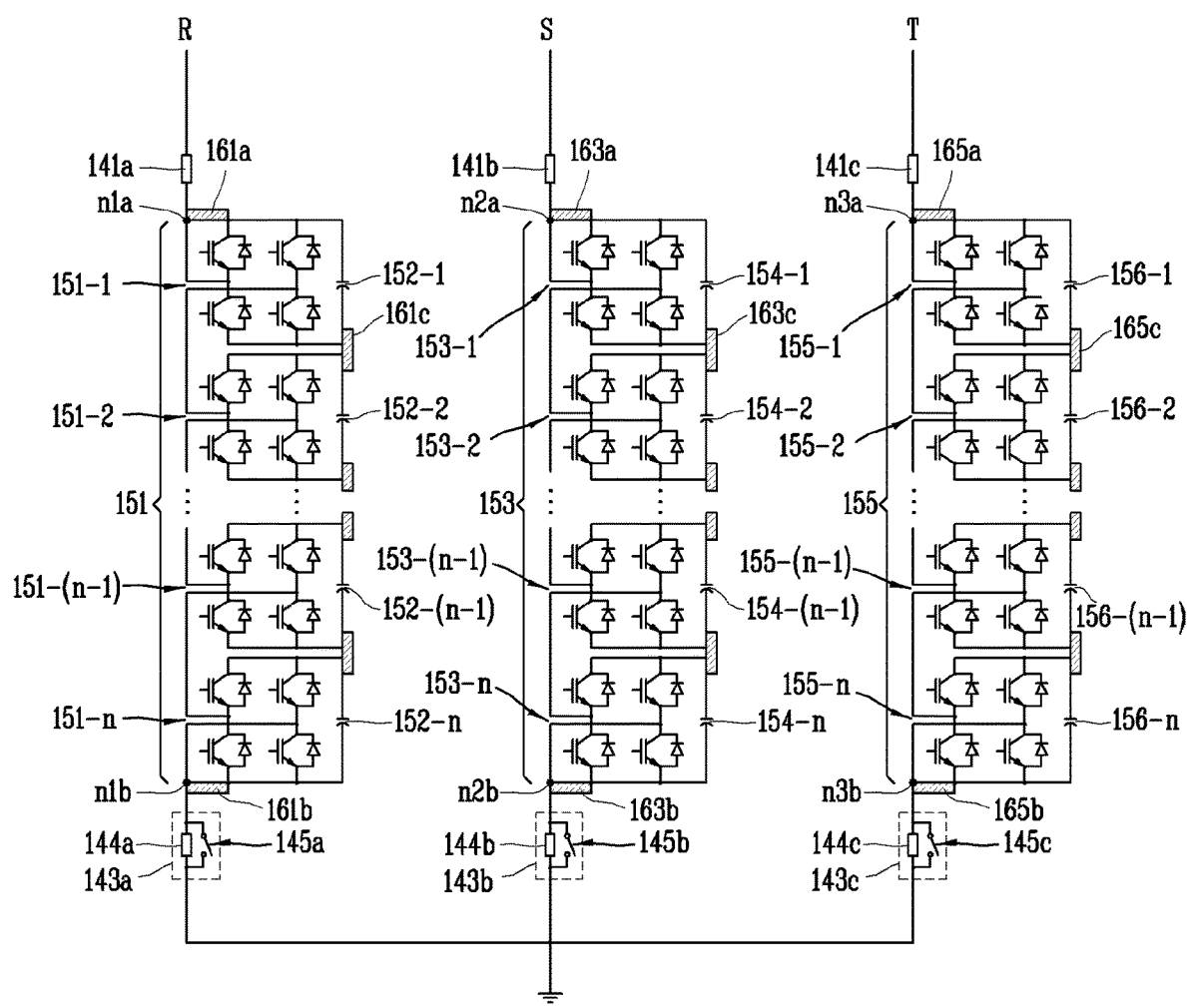

FIGS. 5 and 6 are diagrams for describing a discharging operation in a discharging system including a power compensation unit having a star connection topology structure according to a second embodiment.

FIG. 5 illustrates a power compensation unit having the star connection topology structure when driving is being performed, and FIG. 6 illustrates a power compensation unit having the star connection topology structure when driving is stopped.

As illustrated in FIGS. 2 and 5, when the power compensation unit 110 is being driven, the second switch 105 may be turned off, and the first switch 103 may be turned on. Also, the fourth to sixth switches 115a to 115c respectively included in the first to third current adjusters 113a to 113c of the power compensation unit 110 may be turned off.

In this case, the three-phase voltage of the power in the bus 100 may be supplied to the power compensation unit 110, and thus, a voltage may be charged into the capacitors 152-1 to 152-$n$, 154-1 to 154-$n$, and 156-1 to 156-$n$ of the first to $n^{th}$ submodules 151-1 to 151-$n$, 153-1 to 153-$n$, and 155-1 to 155-$n$ of the first to third clusters 151, 153, and 155 of the first to third converters.

Subsequently, the first to $n^{th}$ submodules 151-1 to 151-$n$, 153-1 to 153-$n$, and 155-1 to 155-$n$ of the first to third converters may be selectively turned on, and thus, reactive power or effective power in the bus 100 may be compensated for. That is, the effective power may be supplied to the bus 100, or the reactive power from the bus 100 may be absorbed.

A case where the power compensation unit 110 is driven is similar to an operation in the power compensation unit 110 having the delta connection topology structure illustrated in FIG. 3, and thus, may be easily understood from description given with reference to FIG. 3. Therefore, a detailed description is omitted.

As illustrated in FIGS. 2 and 6, when the power compensation unit 110 stops, the first switch 103 may be turned off, and then, a plurality of connection electrodes 161a to 161c, 163a to 163c, and 165a to 165c may be respectively connected to the first cluster 151 of the first converter, the second cluster 153 of the second converter, and the third cluster 155 of the third converter.

The plurality of connection electrodes 161a to 161c, 163a to 163c, and 165a to 165c may be connected to or disconnected from the first cluster 151 of the first converter, the second cluster 153 of the second converter, and the third cluster 155 of the third converter, respectively. For example, when the power compensation unit 110 is normally driven, the plurality of connection electrodes may not be connected to the first cluster 151 of the first converter, the second cluster 153 of the second converter, and the third cluster 155 of the third converter. For example, when the power compensation unit 110 stops and thus a residual voltage is discharged, the plurality of connection electrodes may be connected to the first cluster 151 of the first converter, the second cluster 153 of the second converter, and the third cluster 155 of the third converter, and then, when the power compensation unit 110 is in a complete discharging state, a connection of each of the plurality of connection electrodes 161a to 161c, 163a to 163c, and 165a to 165c may be released.

The connection electrodes 161a to 161c, 163a to 163c, and 165a to 165c may be good in electrical conductivity. For example, the connection electrodes 161a to 161c, 163a to 163c, and 165a to 165c may each include a metal material such as copper (Cu).

As seen from above, the connection electrodes 161a to 161c, 163a to 163c, and 165a to 165c may each be provided in a rectangular shape, but are not limited thereto.

In detail, first to third connection electrodes 161a to 161c may be connected to the capacitors 152-1 to 152-$n$ respectively included in the first to $n^{th}$ submodules 151-1 to 151-$n$ so that the capacitors 152-1 to 152-$n$ respectively included in the first to $n^{th}$ submodules 151-1 to 151-$n$ of the first cluster 151 of the first converter are electrically connected.

For example, one side of the first connection electrode 161a may be connected to a first node n1a, and the other side of the first connection electrode 161a may be connected to one side of the capacitor 152-1 of the first submodule 151-1, whereby the first node n1a may be electrically connected to the capacitor 152-1 of the first submodule 151-1 through the first connection electrode 161a. For example, one side of the second connection electrode 161b may be connected to a second node n1b, and the other side of the second connection electrode 161b may be connected to one side of the capacitor 152-$n$ of the $n^{th}$ submodule 151-$n$, whereby the second node n1b may be electrically connected to the capacitor 152-$n$ of the $n^{th}$ submodule 151-$n$ through the second connection electrode 161b. For example, each of a plurality of third connection electrodes 161c may be connected to capacitors 152-1 to 152-$n$ of adjacent submodules 151-1 to 151-$n$, and thus, the capacitors 152-1 to 152-$n$ of the adjacent submodules 151-1 to 151-$n$ may be electrically connected through the plurality of third connection electrodes 161c, respectively.

A width of the third connection electrode 161c may be greater than an interval between the capacitors 152-1 to 152-$n$ of adjacent submodules 151-1 to 151-$n$.

The first to third connection electrodes 163a to 163c may be connected to the capacitors 154-1 to 154-$n$ respectively included in the first to $n^{th}$ submodules 153-1 to 153-$n$ so that the capacitors 154-1 to 154-$n$ respectively included in the first to n$^{th}$ submodules 153-1 to 153-n of the second cluster 123 of the second converter are electrically connected.

For example, one side of the first connection electrode 163a may be connected to a first node n2a, and the other side of the first connection electrode 163a may be connected to one side of each of the capacitors 154-1 to 154-n of the first submodule 153-1, whereby the first node n2a may be electrically connected to the capacitors 154-1 to 154-n of the first submodule 153-1 through the first connection electrode 163a. For example, one side of the second connection electrode 163b may be connected to a second node n2b, and the other side of the second connection electrode 162b may be connected to one side of each of the capacitors 154-1 to 154-n of the n$^{th}$ submodule 153-n, whereby the second node n2b may be electrically connected to the capacitors 154-1 to 154-n of the n$^{th}$ submodule 153-n through the second connection electrode 163b. For example, each of a plurality of third connection electrodes 163c may be connected to capacitors 154-1 to 154-n of adjacent submodules 153-1 to 153-n, and thus, the capacitors 154-1 to 154-n of the adjacent submodules 153-1 to 153-n may be electrically connected through the plurality of third connection electrodes 163c, respectively.

A width of the third connection electrode 163c may be greater than an interval between the capacitors 154-1 to 154-n of adjacent submodules 153-1 to 153-n.

The first to third connection electrodes 165a to 165c may be connected to the capacitors 156-1 to 156-n respectively included in the first to n$^{th}$ submodules 155-1 to 155-n so that the capacitors 156-1 to 156-n respectively included in the first to n$^{th}$ submodules 155-1 to 155-n of the third cluster 155 of the second converter are electrically connected.

For example, one side of the first connection electrode 165a may be connected to a first node n3a, and the other side of the first connection electrode 165a may be connected to one side of each of the capacitor 156-1 of the first submodule 155-1, whereby the first node n3a may be electrically connected to the capacitor 156-1 of the first submodule 155-1 through the first connection electrode 165a. For example, one side of the second connection electrode 165b may be connected to a second node n3b, and the other side of the second connection electrode 165b may be connected to one side of each of the capacitor 156-n of the n$^{th}$ submodule 155-n, whereby the second node n3b may be electrically connected to the capacitor 156-n of the n$^{th}$ submodule 155-n through the second connection electrode 165b. For example, each of a plurality of third connection electrodes 165c may be connected to capacitors 156-1 to 156-n of adjacent submodules 155-1 to 155-n, and thus, the capacitors 156-1 to 156-n of the adjacent submodules 155-1 to 155-n may be electrically connected through the plurality of third connection electrodes 165c, respectively.

A width of the third connection electrode 165c may be greater than an interval between the capacitors 156-1 to 156-n of adjacent submodules 155-1 to 155-n.

Subsequently, when the plurality of connection electrodes 161a to 161c, 163a to 163c, and 165a to 165c are respectively fastened to the first cluster 151 of the first converter, the second cluster 153 of the second converter, and the third cluster 155 of the third converter, the second switch 105 may be turned on, and thus, a residual voltage of each of the first to third clusters 151, 153, and 155 may be discharged through the second switch 105. At this time, the fourth to sixth switches 145a to 145c respectively included in the first to third current adjusters 143a to 143c of the power compensation unit 110 may be turned on or off. When the fourth to sixth switches 145a to 145c are turned off, the residual voltage of each of the first to third clusters 151, 153, and 155 may be more quickly discharged by the first to third resistors 144a to 144c respectively included in the first to third current adjusters 143a to 143c.

Therefore, a voltage remaining in each of the capacitors 152-1 to 152-n of the first cluster 151 may be discharged through the second switch 105 via the first to third connection electrodes 161a to 161c electrically connected to the respective capacitors 152-1 to 152-n of the first to n$^{th}$ submodules 151-1 to 151-n. A voltage remaining in each of the capacitors 154-1 to 154-n of the second cluster 153 may be discharged through the second switch 105 via the first to third connection electrodes 163a to 163c electrically connected to the respective capacitors 154-1 to 154-n of the first to n$^{th}$ submodules 153-1 to 153-n. A voltage remaining in each of the capacitors 156-1 to 156-n of the third cluster 155 may be discharged through the third switch 115 via the first to third connection electrodes 165a to 165c electrically connected to the respective capacitors 156-1 to 156-n of the first to n$^{th}$ submodules 155-1 to 155-n.

According to the second embodiment (see FIGS. 5 and 6), when the power compensation unit 110 stops, the plurality of connection electrodes 161a to 161c, 163a to 163c, and 165a to 165c may be fastened to the capacitors 152-1 to 152-n, 154-1 to 154-n, and 156-1 to 156-n respectively included in the first to n$^{th}$ submodules 151-1 to 151-n, 153-1 to 153-n, and 155-1 to 155-n of the first to third clusters 151, 153, and 155, and thus, voltages remaining in the capacitors 152-1 to 152-n, 154-1 to 154-n, and 156-1 to 156-n respectively included in the first to n$^{th}$ submodules 151-1 to 151-n, 153-1 to 153-n, and 155-1 to 155-n of the first to third clusters 151, 153, and 155 may be quickly discharged through the plurality of connection electrodes 161a to 161c, 163a to 163c, and 165a to 165c, respectively.

Subsequently, the first current sensor 107 and/or the second current sensor 117 may sense a current of the power compensation unit 110, and thus, a discharging state of the power compensation unit 110 may be determined.

Subsequently, the first switch 103 may be turned on and the second switch 105 may be turned off, and thus, a voltage of the power compensation unit 110 may be sensed, whereby the discharging state of the power compensation unit 110 may be determined.

Subsequently, each of the first and second switches 103 and 105 may be repeatedly turned on or off, and thus, a voltage sensed by the voltage sensor 101 or a current sensed by the first current sensor 107 and/or the second current sensor 117 may be repeatedly checked, whereby whether the power compensation unit 110 is in a complete discharging state may be determined. For example, when a voltage of the power compensation unit 110 is equal to or lower than 5% of a rated voltage, it may be determined that the power compensation unit 110 is in the complete discharging state. The rated voltage may be a maximum voltage capable of being charged into the capacitors 152-1 to 152-n, 154-1 to 154-n, and 156-1 to 156-n, but is not limited thereto.

As described above, since each of the first and second switches 103 and 105 is repeatedly turned on or off, a worker (or a system operator) may easily check a complete discharging state of the power compensation unit 110, and an operation (an operation of replacing a defective submodule) needed for the complete discharging state may be performed, thereby securing stability of the worker.

The discharging connection unit illustrated in FIG. 4 and the connection electrode illustrated in FIG. 6 may each be referred to as a discharging connection member.

Effects of the reactive power compensator and the discharging system according to the embodiments will be described below.

According to at least one of the embodiments, when the power compensation unit is stopped, the first to third discharging connection units may be respectively connected to the capacitors of the first to $n^{th}$ submodules of the first to third clusters, and thus, voltages remaining in the capacitors of the first to $n^{th}$ submodules of the first to third clusters may be quickly discharged through the first to third discharging connection units.

According to at least one of the embodiments, by repeatedly performing an operation of selectively connecting a bus to a ground while discharging is being performed through the first to third discharging connection units, a worker (or a system operator) may easily check a complete discharging state of the power compensation unit on the basis of a current sensed by the current sensor and a voltage sensed by the voltage sensor, and a desired operation (an operation of replacing a defective submodule) may be performed in a complete discharging state, thereby securing stability of the worker.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A reactive power compensator comprising:
a first converter connected between a first line and a second line;
a second converter connected between the second line and a third line; and
a third converter connected between the third line and the first line,
wherein the first to third lines are connected to a bus,
wherein the first converter comprises:
a first cluster including first to $n^{th}$ submodules which are serially connected to one another and each include a first capacitor; and
a first discharging connection unit connected to the first capacitor so that the first capacitors of the first to $n^{th}$ submodules are electrically connected to one another, when driving of the reactive power compensator stops,
wherein the second converter comprises:
a second cluster including first to nth submodules which are serially connected to one another and each include a second capacitor; and
a second discharging connection unit connected to the second capacitor so that, when driving of the reactive power compensator stops, the second capacitors of the first to nth submodules are electrically connected to one another,
wherein the third converter comprises:
a third cluster including first to $n^{th}$ submodules which are serially connected to one another and each include a third capacitor; and
a third discharging connection unit connected to the third capacitor so that, when driving of the reactive power compensator stops, the third capacitors of the first to $n^{th}$ submodules are electrically connected to one another, and
wherein each of the first to third discharging connection units comprises:
a supporter having a length which is greater than a width of each of the first to third clusters; and
a plurality of connection electrodes disposed on one surface of the supporter.

2. The reactive power compensator of claim 1, wherein each of the plurality of connection electrodes is connected to a capacitor of a submodule adjacent thereto.

3. The reactive power compensator of claim 1, wherein the supporter comprises a resin material, and each of the plurality of connection electrodes comprises a metal material.

4. The reactive power compensator of claim 1, wherein a width of each of the plurality of connection electrodes is greater than an interval between capacitors of adjacent submodules.

5. A reactive power compensator comprising:
a first converter connected between a first line and a ground;
a second converter connected between a second line and the ground; and
a third converter connected between a third line and the ground,
wherein the first to third lines are connected to a bus,
wherein the first converter comprises:
a first cluster including first to $n^{th}$ submodules which are serially connected to one another and each include a first capacitor; and
first to third connection electrodes connected to the first capacitor so that, when driving of the reactive power compensator stops, the first capacitors of the first to $n^{th}$ submodules are electrically connected to one another,
wherein the second converter comprises:
a second cluster including first to $n^{th}$ submodules which are serially connected to one another and each include a second capacitor; and
first to third connection electrodes connected to the second capacitor so that, when driving of the reactive power compensator stops, the second capacitors of the first to $n^{th}$ submodules are electrically connected to one another,
wherein the third converter comprises:
a third cluster including first to $n^{th}$ submodules which are serially connected to one another and each include a third capacitor; and
first to third connection electrodes connected to the second capacitor so that, when driving of the reactive power compensator stops, the third capacitors of the first to $n^{th}$ submodules are electrically connected to one another, and wherein a width of each of the first to third connection electrodes of each of the first to third converters is greater than an interval between capacitors of adjacent submodules.

6. The reactive power compensator of claim 5, wherein the first connection electrode of each of the first to third converters connects the first to third lines to the first to third capacitors respectively included in the first submodules of each of the first to third converters, the second connection electrode of each of the first to third converters comprises a plurality of connection electrodes, each of the plurality of connection electrodes connects capacitors of adjacent submodules, the third connection electrode of each of the first to third converters connects the ground to the first to third capacitors respectively included in the $n^{th}$ submodules of each of the first to third converters.

7. The reactive power compensator of claim 6, wherein each of the first to third connection electrodes of each of the first to third converters comprises a metal material.

8. A discharging system comprising:
a power compensation unit connected to a bus, the power compensation unit including first to third clusters;
a first switch configured to turn on or off so that the power compensation unit is connected to or disconnected from the bus;
a second switch configured to turn on or off so that the power compensation unit is selectively connected to the bus or a ground;
a voltage sensor connected between the bus and the first to third clusters; and
a current sensor connected between the bus and the power compensation unit,
wherein, when driving of the power compensation unit stops, the first switch is turned off and a discharging connection member is connected to capacitors of each of first to $n^{th}$ submodules included in the first to third clusters so that the capacitors are electrically connected to one another, and then, the second switch is turned on and a residual voltage of each of the first to $n^{th}$ submodules is discharged to the ground via the discharging connection member and the second switch,
wherein the discharging connection member includes a supporter and a plurality of connection electrodes disposed in the supporter; and wherein a width of each of the connection electrodes is greater than an interval between capacitors of adjacent submodules.

9. The discharging system of claim 8, wherein a complete discharging state is determined based on a voltage sensed by the voltage sensor and a current sensed by the current sensor, when the residual voltage of each of the first to $n^{th}$ submodules is discharged.

10. The discharging system of claim 8, wherein each of the first to third clusters has a delta connection topology structure.

11. The discharging system of claim 8, wherein each of the first to third clusters has a star connection topology structure.

12. An operating method of a discharging system including a power compensation unit which is connected to a bus and includes first to third clusters, a first switch configured to turn on or off so that the power compensation unit is connected to or disconnected from the bus, a second switch configured to turn on or off so that the power compensation unit is selectively connected to the bus or a ground, a voltage sensor connected between the bus and the first to third clusters, and a current sensor connected between the bus and the power compensation unit, the operating method comprising:
turning off the first switch and connecting a discharging connection unit to the first to third clusters when the power compensation unit stops;
turning on the second switch to discharge a voltage of each of the first to third clusters through the discharging connection unit and the second switch;
sensing a current of the power compensation unit by using the current sensor to check a discharging state of the power compensation unit; and
turning on the first switch, turning off the second switch, and sensing a voltage of the power compensation unit by using the voltage sensor to check a discharging state of the power compensation unit,
wherein the discharging connection unit includes a supporter and a plurality of connection electrodes disposed in the supporter; and
wherein a width of each of the connection electrodes is greater than an interval between capacitors of adjacent submodules.

* * * * *